United States Patent [19]

Deutsch et al.

[11] 4,384,713

[45] May 24, 1983

[54] SAFETY ROLLING INVALID WALKER

[75] Inventors: Fritz A. Deutsch, Euclid, Ohio; Dwight L. Mayo, Jr., Hingham, Mass.

[73] Assignee: White Cap Enterprises Corporation, Hull, Mass.

[21] Appl. No.: 155,292

[22] Filed: Jun. 2, 1980

Related U.S. Application Data

[63] Continuation-in-part of Ser. No. 153,965, May 28, 1980, abandoned.

[51] Int. Cl.³ .............................................. A61H 3/04
[52] U.S. Cl. .................................. 272/70.3; 188/31; 188/167; 280/47.34
[58] Field of Search ............. 272/70.3, 70.4, 70; 297/5, 6; 135/67; 280/42, 47.35, 47.34, 87.02 R; 188/166, 167, 31, 69, 83

[56] References Cited

U.S. PATENT DOCUMENTS

| | | | |
|---|---|---|---|
| 1,709,527 | 4/1929 | Ford | 188/167 X |
| 1,917,440 | 7/1933 | Finkbeiner et al. | 272/70.4 X |
| 2,958,537 | 11/1960 | Young | 188/31 X |
| 2,988,175 | 6/1961 | West | 188/31 |
| 3,200,907 | 8/1965 | Hansen | 188/167 X |
| 4,018,440 | 4/1977 | Deutsch | 272/70.3 |
| 4,094,330 | 6/1978 | Jong | 135/67 |

FOREIGN PATENT DOCUMENTS 1458082 10/1966 France .................. 280/47.34

*Primary Examiner*—Richard C. Pinkham
*Assistant Examiner*—Arnold W. Kramer
*Attorney, Agent, or Firm*—Charles E. Pfund

[57] ABSTRACT

A rolling invalid walker has normally locked wheels and one or more hand controls for disengaging the locks to permit unlimited rolling. A preferred embodiment comprises a walker frame with four legs and wheels. The two front wheels are normally locked, and a pair of hand controls are provided for disengaging the locks with minimal pressure. The hand controls are coupled together by a horizontal tie rod so that the wheels can be unlocked by either or both controls and so that emergency pressure on either control will lock the wheels.

7 Claims, 10 Drawing Figures

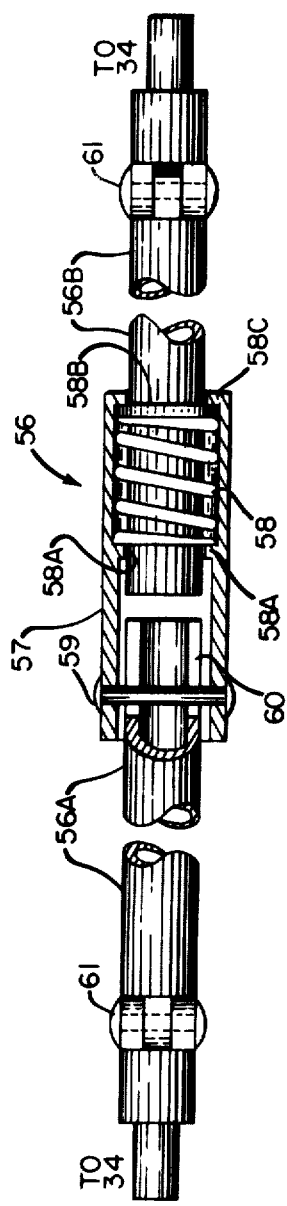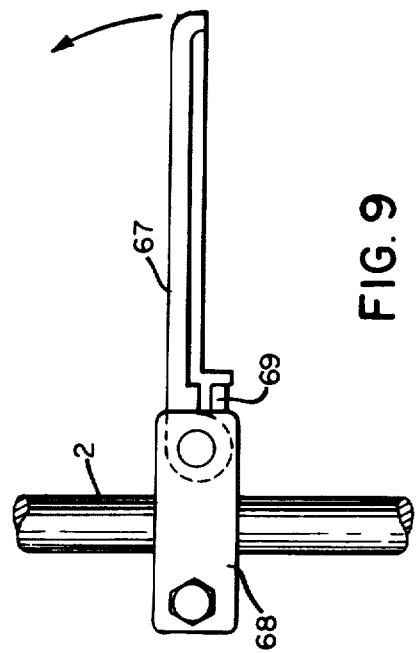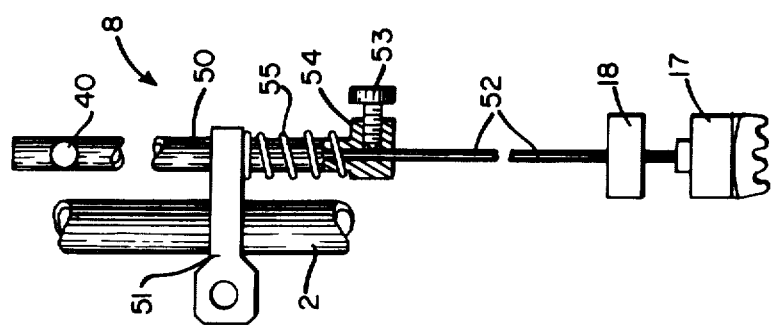

SAFETY ROLLING INVALID WALKER

CROSS REFERENCE TO RELATED APPLICATION

This is a continuation-in-part of U.S. Pat. application Ser. No. 153,965 of Fritz A. Deutsch and Dwight L. Mayo, Jr., filed May 28, 1980, entitled SAFETY ROLLING INVALID WALKER and now abandoned.

FIELD OF THE INVENTION

This invention relates to an invalid walker and, in particular, to a rolling walker having normally locked wheels and one or more hand controls for disengaging the locks to permit rolling.

BACKGROUND OF THE INVENTION

Invalid walkers are highly useful devices for assisting physically handicapped persons to walk.

A conventional invalid walker is essentially an open, lightweight frame fitted with four adjustable, rubber-tipped legs. In use, a handicapped person leans on the walker for support between steps. In moving forward, he physically lifts the walker and advances it to a new position where it again provides support. The major difficulty with this type of walker is that it fails to provide support during stepping, when it is needed most. In addition, the user must burden his injured legs with both his own weight and that of the walker.

Attempts have been made to overcome these difficulties by applying rollers to the walker. Such walkers have typically been provided with frictional brakes to be applied at the discretion of the user. These walkers, however, have generally been unsafe because the walker's movements are completely uncontrolled until the user applies the brakes. Unless the handicapped user has agility, alertness and strength, comparable to that of a driver of an automobile, there is a serious possibility that the walker will roll ahead of him to such a degree that it can no longer provide vertical support.

To reduce the risk of uncontrolled rolling, U.S. Pat. No. 4,018,440, issued to applicant Fritz A. Deutsch, discloses a rolling walker having an incrementing wheel control mechanism which permits a wheel to roll a predetermined distance corresponding to a step and then automatically locks it. The handicapped person releases the wheel and then steps forward. The walker rolls forward with the step, providing support and then locks. The user thus moves forward in a series of releases, steps and locks. While this incrementing walker is a distinct improvement over the conventional walker, the necessity of successive releases between steps, like the necessity of lifting a conventional walker, makes it difficult for the user to practice a "normal" smooth gate.

Accordingly, there is a need for an improved rolling walker capable of permitting safe, continuous walking at a normal gait.

In an effort to provide a rolling walker for permitting the user to engage in continuous walking, applicant Deutsch devised a Bowden cable controlled walker having normally locked wheels. This walker is described in the Bulletin of Prosthetics Research, pages 182-184, U.S. Veteran's Administration (BPR 10-31 Spring 1979). A single handgrip coupled to the locking mechanisms via the cable permitted the user to disengage the locking mechanism enabling the walker to roll.

This cable controlled walker, however, presents a number of problems. One is that the cable is a relatively frictional coupling, and many handicapped users find it difficult and tiresome to exert the grip pressure required to enable the walker. A second difficulty is that cable coupling is relatively flimsy. Connections can easily be broken if, for example, the cable snags on a solid object. Furthermore, even in the absence of disconnection, the cable arrangements must be adjusted at a relatively high frequency. Moreover, the usefulness of the walker in accommodating users with different hand preferences (i.e. right or left) is limited by the substantial difficulty in switching the grip and cable coupling from one side of the walker to the other.

SUMMARY OF THE INVENTION

In accordance with the invention, a rolling invalid walker has normally locked wheels and one or more hand controls for disengaging the locks to permit rolling. A preferred embodiment comprises a walker frame with four legs and wheels. The two front wheels are normally locked, and a pair of hand controls are provided for disengaging the locks with minimal force. The hand controls are coupled together by a horizontal tie rod so that the wheels can be unlocked by either or both controls and so that emergency pressure on either control will lock the wheels.

To secure positive locking action, the front wheels are preferably locked by multiple-tooth segments which engage respective gears attached to each wheel.

To prevent the walker from running away from the user when it is unlocked, adjustable frictional braking means are preferably incorporated in each front wheel.

A preferred feature of the present walker is the addition of an "Emerengy Grip" locking capability. This provision is specially desirable for severely handicapped persons, who, stricken with sudden fainting spells or other unexpected indispositions, may grip the handle desperately rather than release it. Thus, the lock release mechanism is developed as three-state control: In the absence of user engagement (gripping), the walker remains locked; with intermediate gripping, the walker is unlocked for continuous rolling; and with "emergency" levels of gripping, the walker is again locked.

Because the walker need not be lifted at any time while in operation, it can carry a substantial load. Accordingly, a foldable basket can be attached when needed.

Because the walker is automatically locked when not operated, a foldable seat can safely be attached.

BRIEF DESCRIPTION OF THE DRAWINGS

The nature, advantages, and various features of the invention will appear more fully upon consideration of the illustrative embodiments now to be described in detail in connection with the accompanying drawings.

In the drawings

FIG. 7 illustrates a preferred vertical linkage between the hand control lock release mechanism and the wheel locking mechanism.

FIG. 8 illustrates of a preferred horizontal linkage for coupling the operation of the two hand controls.

FIG. 9 illustrates a preferred folding seat arrangement for use in the embodiment of FIG. 1.

For convenience of reference, the same structural elements are designated by the same reference numerals throughout the drawing.

DETAILED DESCRIPTION OF THE DRAWINGS

A. The Walker Generally (FIG. 1)

Figure 1:
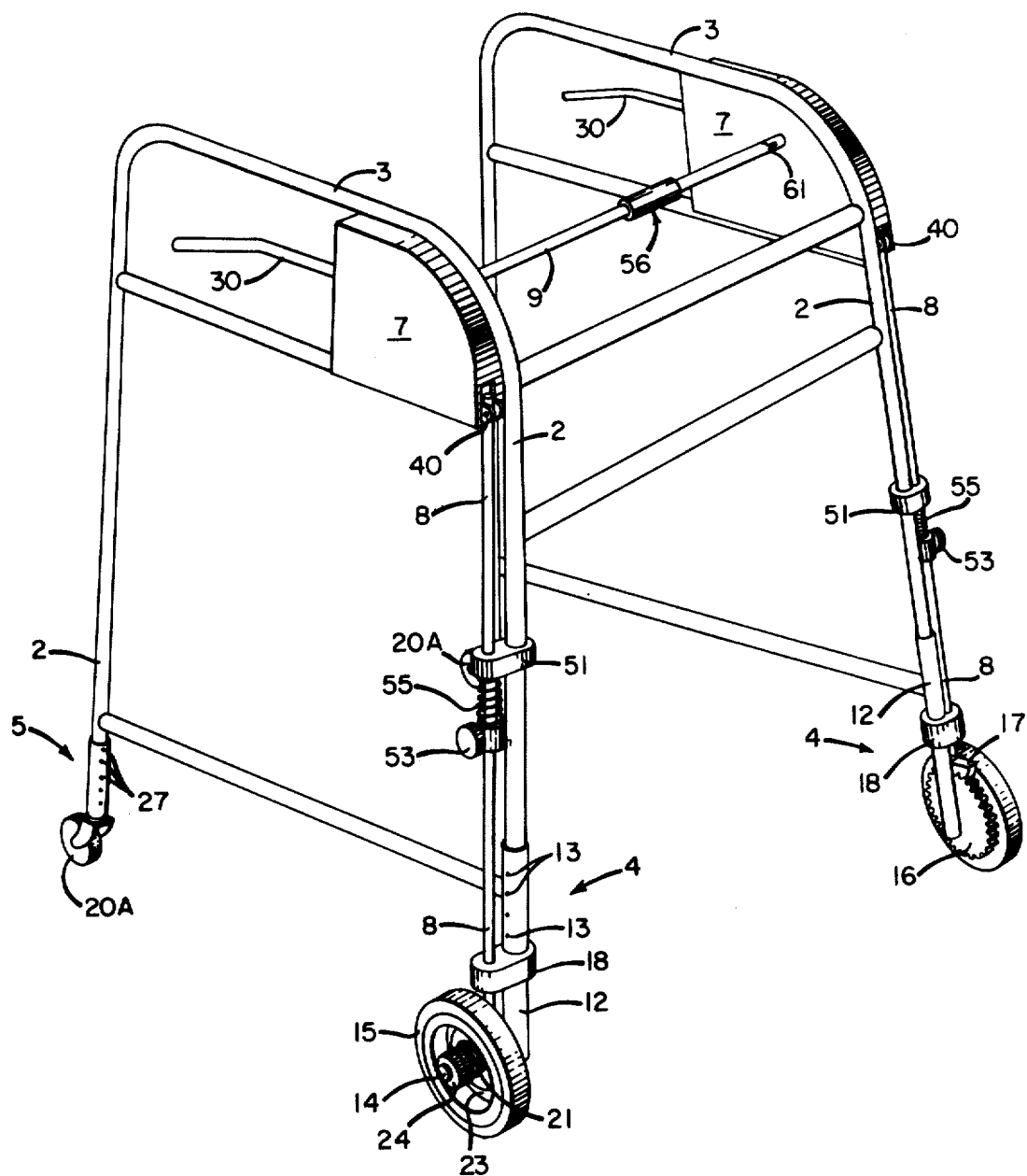
FIG. 1 is a perspective view of a first embodiment of a rolling walker in accordance with the invention.

Referring to the drawings, FIG. 1 shows a first embodiment of a rolling walker in accordance with the invention comprising a modified conventional folding walker frame 1 having four support legs 2 and left and right horizontal bars 3.

The walker frame is modified by the addition to the legs of roller means comprising a pair of front wheel assemblies 4 and a pair of rear roller assemblies 5. Releasable lock means 6 are provided for locking preferably front wheel assemblies 4, and hand control lock release arrangements, preferably comprising left and right hand grips 7 are conveniently attached to the left and right horizontal bars of frame 1. Vertical linkages 8 are provided for coupling the lock release grips with the front wheel lock means, and a horizontal linkage preferably in the form of a horizontal tie bar 9 is provided for coupling the left and right grips.

The hand control lock release means (preferably gripping control means) and the locking means are arranged and linked together in such a fashion that, in the absence of hand pressure in excess of a predetermined enabling threshold, the front wheel remains locked. Hand pressure within a predetermined intermediate range of enabling pressures, disengages the lock and permits unlimited continuous rolling; and hand pressures in excess of a predetermined emergency threshold pressure reengage the locks and stop the wheels.

Preferably the left and right hand control lock release means are coupled together by the horizontal linkage 9 in such a fashion that an enabling hand pressure on either control permits rolling, except that an emergency pressure on either control locks the wheels, irrespective of the pressure on the other.

B. The Front Wheel Assembly (FIGS. 2, 3 and 4)

Figure 2:
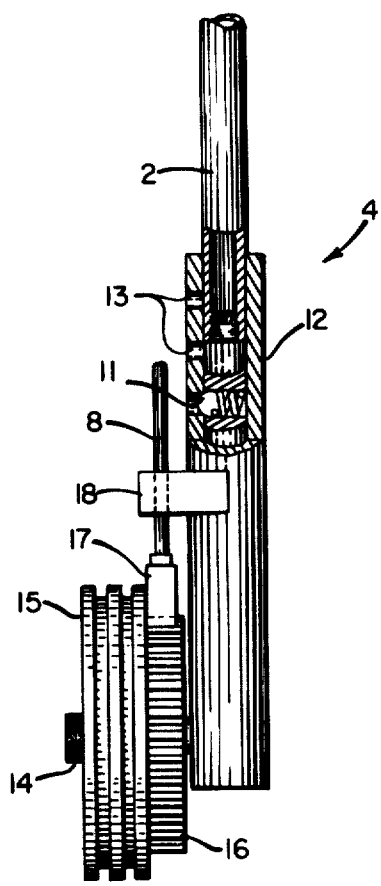
FIGS. 2 and 3 are front and side views, respectively, of a preferred front wheel assembly useful in the embodiment of FIG. 1.
Figure 3:
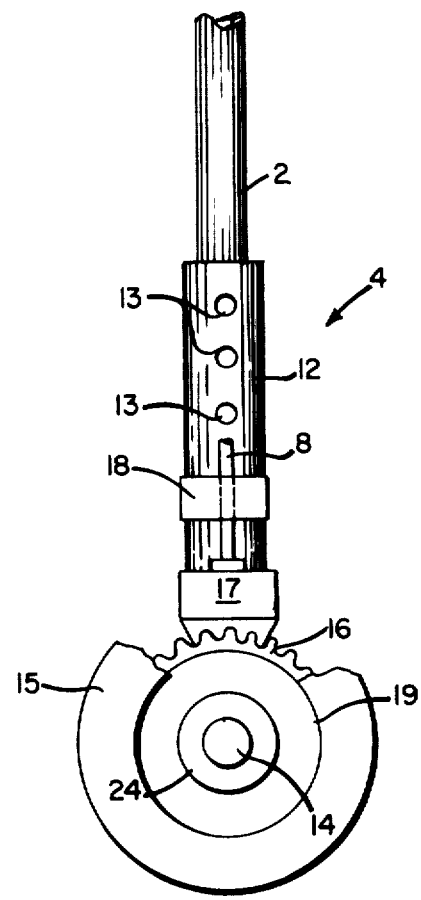
Figure 4:
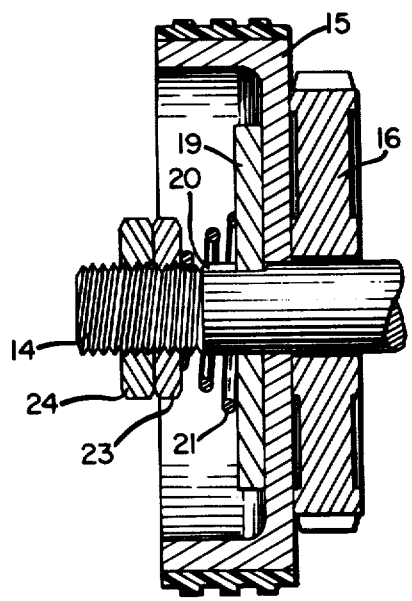
FIG. 4 is a radial cross section of a preferred front wheel braking mechanism useful in the embodiment of FIG. 1.

FIGS. 2 and 3 are front and side views, respectively, of a preferred front wheel assembly 4 for use in the embodiment of FIG. 1. In essence, each assembly comprises a tubular sleeve 12 having an aligned series of holes 13 and short protruding shaft 14. A rubber-lined wheel 15 is rotatably mounted on shaft 14.

The assembly 4 is adjustably mounted on front support leg 2 by, for example, a spring loaded ball 11 inserted in the leg for engaging one of the holes 13.

The wheel 15 is provided with releasable locking means advantageously in the form of a toothed-gear 16 attached to the wheel. An engaging toothed segment 17, preferably curved to conform with the gear, is attached to vertical linkage 8 and supported in position by guide 18 for engaging gear 16, thereby positively locking the attached wheel. Spring means 55 are conveniently provided for biasing the vertical linkage in such a manner as to maintain the segment 17 normally engaged with gear 16, thereby maintaining the wheel in a normally locked condition.

Advantageously, wheel 15 is also provided with an adjustable friction brake to reduce the danger of inadvertent runaway. FIG. 4, which is a cross section of wheel 15, illustrates such a brake comprising a frictional disc 19 supported on shaft 14 and held from turning by a groove-key arrangement 20. Disc 19 is pressed against the inner face of wheel 15 by a spring 21 on shaft 14 between disc 19 and a nut 23 threaded on the free end of shaft 14.

The friction brake is adjusted by turning nut 23 to adjust the pressure on disc 19. Counter-nut 24 is conveniently added to preserve the chosen adjustment of the brake.

Alternatively, a friction plate (not shown) could be mounted at the base of shaft 14 against sleeve 12, and the wheel and gear combination could be adjustably spring biased against the plate.

C. The Rear Roller Assembly (FIG. 5)

Figure 5:
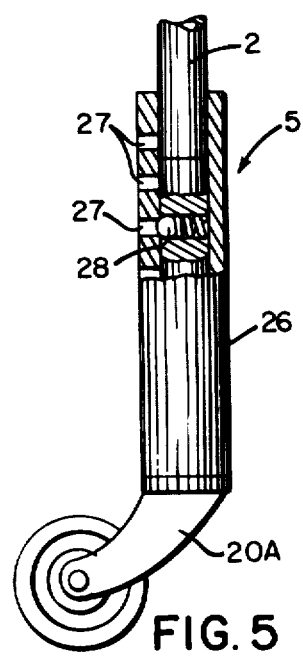
FIG. 5 is a side view in partial cross section of a preferred rear wheel useful in the embodiment of FIG. 1.

FIG. 5 illustrates a preferred rear roller assembly 5 for the walker. The assembly comprises a sleeve 26 having aligned holes 27 and a rubber-lined castor 20a fitted into the sleeve. The sleeve can be shifted on leg 2 for the purpose of adjusting the height of the walker. The chosen adjusted position is secured by a spring loaded ball 28 engaging one of the holes 27.

D. The Hand Control Lock Release Mechanisms (FIGS. 6A and 6B)

The walker is normally automatically locked through the engagement in each front wheel assembly between segment 17 and gear 16. The walker can be unlocked by its user by engaging either one or both of the hand controls 7 on the left and right sides of the walker.

Figure 6A:
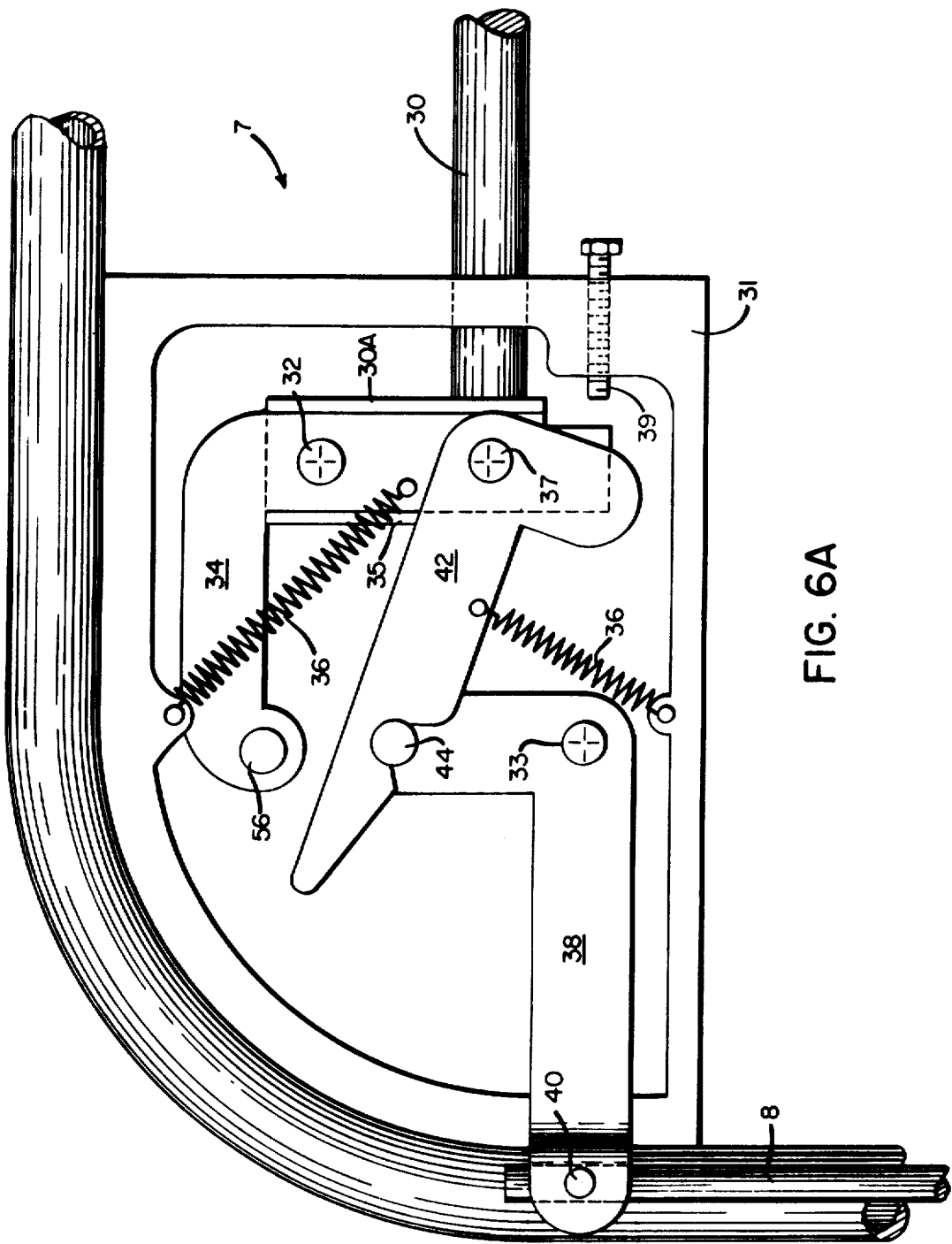
FIGS. 6A and 6B are plan and partial cross sectional views of a preferred hand control lock release mechanism useful in the embodiment of FIG. 1.
Figure 6B:
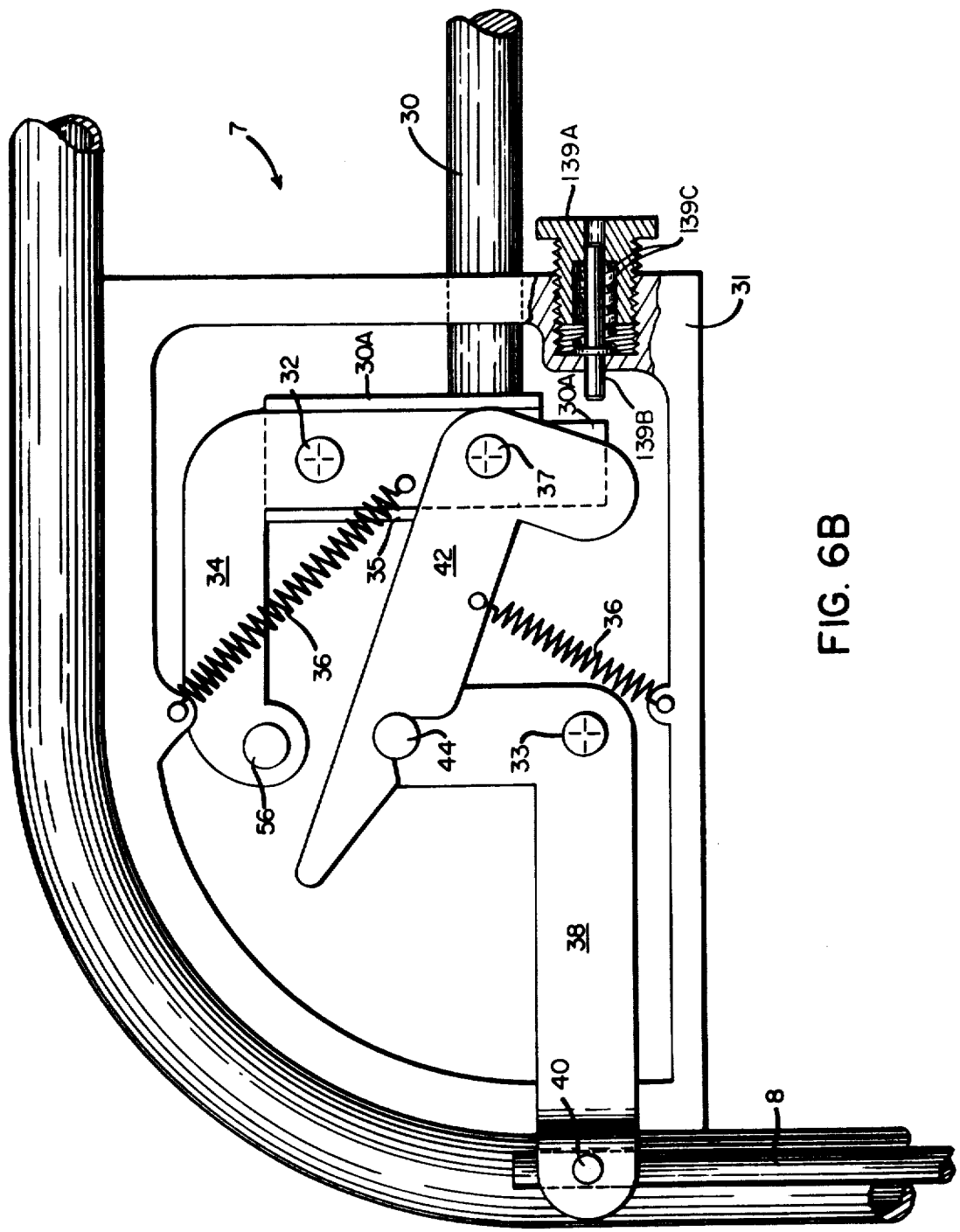

FIG. 6A illustrates a preferred hand control lock release mechanism 7 in its starting position wherein the walker is locked.

Each hand control lock release mechanism comprises a base plate 31 having projecting mounting pins 32 and 33. Pivotally mounted on pin 32 is a grip handle 30 and an L-shaped mechanism activator 34. The grip handle 30 includes an extension 30A including a shoulder 35 for rotating the mechanism activator 34 counterclockwise in response to a squeezing grip on handle 30. A spring 36 is advantageously provided for biasing the mechanism activator in a starting position for locking the wheels.

Hingeably connected to the upper end of activator 34 is one end of horizontal tie bar 56 (as illustrated in FIG. 8) for coupling together the left and right hand controls. The other end of tie bar 56 is similarly connected to the activator of the other hand control (not shown).

Pivotally mounted on the other end of activator 34 via pin 37, is an L-shaped pawl 42. One end of the pawl is configured in the form of a hook 43.

Also pivotally mounted on plate 31, via pin 33, is an L-shaped bell crank 38. One end of the bell crank is pivotally connected, via pin 40, to vertical tie linkage 8. The other end is disengagably coupled to pawl 42 via pin 44 and hook 43. Spring 36 is advantageously provided for biasing hook 43 onto pin 44.

A trip adjustment screw 39 projecting toward the end of pawl 42 opposite hook 43 is provided for rotating the pawl clockwise for grip displacement beyond a predetermined amount. Such rotation has the effect of raising hook 43 off pin 44, thereby disengaging the bell crank from the control grip.

In the absence of gripping pressure on handle 30, the wheels are locked. The effect of the bias springs is such as to maintain the release mechanism in position for wheel locking. This is effected primarily through a bias spring (55 of FIG. 7) on the vertical tie rod.

With intermediate grip displacements, the locks are disengaged so the wheels can roll. Shoulder 35 forces the mechanism activator to rotate counterclockwise, thereby displacing the pawl 42 to the right. This displacement rotates the bell crank 38 clockwise which, in turn, raises the vertical tie bar and disengages the lock (not shown). The walker is now free to roll.

Displacements beyond a predetermined amount effect an emergency locking of the wheels. With sufficient rotation of activator 34, the end of the pawl 42 is forced into contact with the trip adjustment mechanism 39. This contact forces the pawl to rotate clockwise, raising hook 43 from pin 44, and thereby disengaging the vertical tie bar from the linkage. The lock then snaps into engagement, locking the wheel. The trip adjustment mechanism can be adjusted or eliminated, as desired, by rotation of screw 139A.

The right hand and left hand release mechanisms are coupled together via horizontal tie bar 56. With this coupling the maximum displacement of either grip prevails. Thus, if one hand of the user applies an emergency grip, the wheels are locked, irrespective of the pressure applied at the other grip.

FIG. 6B, which is a partial cross section of the region behind screw 39, shows an alternative embodiment including an optional mechanism which can be used to adjust the force required to effect emergency locking.

The force adjustment mechanism comprises a screw 139A having a hollow interior for receiving a shouldered pin 139B and a shoulder for engaging a spring 139C. The hollow screw 139A fits within an appropriately threaded portion of base plate 31, and shouldered pin 139B is projected by spring 139C toward the lower portion of handle extension 30A. The pin and the handle extension are so dimensioned that the pin will strike the handle extension, as the handle is gripped, before a screw 39 such as is shown in FIG. 6A strikes pawl 42.

It may readily be seen that rotating screw 139A in this mechanism controls the force required to engage the emergency lock. If screw 139A is screwed only part way in, when the handle extension 30A strikes pin 139B, it will compress the spring 139C and move the pin to a point where screw 39 of FIG. 6A trips the emergency lock. As the screw 139A is increasingly screwed in, the resulting precompression of the spring will increase the gripping force required to trip the lock. Finally, if the screw 139A is screwed all the way in, the pin 139B is immobilized, and emergency locking is precluded because the striking of pin 139B against the handle extension prevents the handle from being displaced by an amount which would bring screw 39 of FIG. 6A into contact with pawl 42.

E. The Vertical Lock Linkage (FIG. 7)

FIG. 7 illustrates the components of a preferred vertical lock linkage 8 for coupling a hand control lock release mechanism 7 to the locking arrangement in a front wheel assembly 4. Each vertical linkage comprises, in essence, hollow tube 50, slidably supported by a bracket 51 and a slidable rod 52 inserted into tube 50. Bracket 51 is attached to a walker leg 2, and slidable rod 52 is rigidly connected to tube 50 by a pointed screw 53 tightened into a threaded hold 54.

The lower end of rod 52 passes through guide 18 and is attached to toothed locking segment 17.

Advantageously a spring 55 is disposed between bracket 51 and hold 54 to bias the linkage, and thus the segment 17, into locking position or gear 16 (not shown).

With this arrangement the length of the vertical linkage can readily be adjusted by sliding more or less of rod 52 into tube 50 before tightening screw 53. Thus the length of the linkage can be adjusted to correspond to adjustments in the height of the walker legs.

F. The Horizontal Linkage (FIG. 8)

FIG. 8 illustrates a preferred horizontal linkage 9 for coupling the operation of the left and right hand control lock release mechanisms 7.

The preferred horizontal linkage is a collapsible horizontal tie bar comprising two hollow rod portions 56A and 56B disengagably but rigidly coupled together by a slotted cylindrical sleeve 57 slidably positioned on one of the portions, e.g. 56B. free to contract or expand between shoulder 58A and collar 58B, biases the slotted sleeve in locking position, and pin 59 on the sleeve fits within a corresponding slot 60 in the other portion 56A. Preferably a second shoulder 58C is provided for retaining the sleeve 57 on portion 56B. Hingable connectors 61 are provided hingably coupling the hollow rod portions to the respective mechanism activators 34 of the left and right hand lock release mechanisms.

With this horizontal coupling arrangement, activation of either hand control is transmitted to the vertical linkages to both front wheels. Thus the user can unlock both front wheels with one or both hands.

The walker of the invention can be made as a folding walker by simply applying this horizontal coupling arrangement to a conventional folding walker. In this instance, upon folding the rod portions 56A and 56B are decoupled by sliding sleeve 57 toward portion 56B and then pivoting portions 56A and 56B apart.

G. Foldable Seat

Since the walker of the invention is automatically locked when not released by its users, it is safe to provide it with some kind of foldable seat arrangement. As shown in FIG. 9, a laterally extended seat 67 is pivoted in brackets 68 fastened to each side of the walker's frame. In the down position, seat 67 is held by pins 69 inserted in brackets 68. A similar arrangement with wire wicker sides can be used as a basket.

Accordingly, it can be seen that the walker of the invention has normally locked wheels with hand controls for disengaging the locks to permit unlimited rolling. This arrangement is particularly useful as a rehabilitation device in that it permits the user to practice a normal gait without the necessity of stopping between steps. Thus the device has a distinct therapeutic value in assisting the temporarily injured and mildly handicapped in their efforts to achieve normal walking.

While the invention has been described in connection with a small number of specific embodiments, it is to be understood that these are merely illustrative of the many other specific embodiments which can also utilize the principles of the invention. Thus, numerous and varied devices can be made by those skilled in the art without departing from the spirit and scope of the present invention.

What is claimed is:

1. A walker comprising a rigid frame provided with supporting wheels, said frame comprising spaced, parallel, horizontally positioned handrails between which a patient can stand with his hands resting on the handrails to support his weight, wheel locking means applicable to each of two wheels, hand levers having first positions relative to each of the handrails such as to be within the grasp of the hands and fingers when gripping the handrails, kinematic means connecting the hand levers to the wheel locking means and spring means biasing the wheel locking means to locking position when the hand levers occupy said first position, characterized in that the hand levers, when moved from said first position toward the handrails by contraction of the hands and fingers on the handrails, release the wheel locking means so as to permit the wheels to roll for free wheeling of the walker but, when moved a further distance in the same direction toward the handrails, by tightening of the grasp upon the hand levers, reapplies the wheel locking means to the wheels so as to immobilize the walker.

2. A walker according to claim 1 wherein the kinematic means comprises a pair of actuators, means pivotally supporting the actuators for rocking about a horizontal axis, said hand levers being operable to effect rotation of the actuators, means rigidly connecting the actuators to each other such that rotation of the actuators can be effected by either one separately of the hand levers or both of the hand levers simultaneously, a pair of cranks, means pivotally supporting the cranks for rocking about a horizontal axis parallel to the axis about which the actuators are supported for rocking, means pivotally connecting one arm, respectively, of each crank to a respective one of the wheel locking means, a pin fixed to the other arm of each crank, a pair of pawls pivotally mounted to the respective actuators, means yieldably holding a hook end of each respective pawl in engagement with a respective pin such that rocking of the actuators a predetermined distance will rock the cranks in a direction to disable the wheel locking means and means positioned to be engaged by the other ends of the pawls when the actuators are moved a predetermined further distance to disengage the hook from the pins to reapply the wheel locking means to the wheels so as to immobilize the walker.

3. A walker according to claim 2 wherein the there is means positioned to yieldably resist movement of the hand lever the further distance and there is means for adjusting the yield of said means to enable controlling the degree of pressure required to disable the locking means.

4. A walker according to claim 3 wherein the means for yieldably resisting said further movement are adjustable independently of each other.

5. A walker according to claim 2 wherein the means pivotally connecting one arm, respectively, of each crank to a respective one of the wheel locking means are connecting rods connected at one end to the wheel locking means and at their other ends to the cranks and wherein the spring means are mounted on the connecting rods for biasing the connecting rods in a direction to enable the wheel locking means and there are means for adjusting the compression of the springs.

6. A walker according to claim 5 wherein the wheel locking means comprise toothed gears fixed to the wheels and toothed segments connected to the connecting rods movable into engagement with the toothed wheels.

7. A walker according to claim 1 wherein wheel shafts support the wheels and there are friction brake means mounted on the shafts for frictional engagement with the wheels adjustable thereon to control the freedom of rotation of the wheels when the wheel locking means are disabled.

* * * * *